R. BARNFATHER.
TIRE INFLATING DEVICE.
APPLICATION FILED OCT. 21, 1909.

972,050.

Patented Oct. 4, 1910.
2 SHEETS—SHEET 1.

Witnesses
E. J. Gibbs
G. Manning

Inventor
Robert Barnfather.
By T. Walter Fowler
atty

R. BARNFATHER.
TIRE INFLATING DEVICE.
APPLICATION FILED OCT. 21, 1909.

972,050.

Patented Oct. 4, 1910.

2 SHEETS—SHEET 2.

Witnesses.
E. G. Gibbs.
G. Manning.

Inventor.
Robert Barnfather.
By T. Walter Fowler
atty.

UNITED STATES PATENT OFFICE.

ROBERT BARNFATHER, OF CROYDON, ENGLAND.

TIRE-INFLATING DEVICE.

972,050.  Specification of Letters Patent.  Patented Oct. 4, 1910.

Application filed October 21, 1909. Serial No. 523,837.

*To all whom it may concern:*

Be it known that I, ROBERT BARNFATHER, a subject of the King of England, and residing at 6 Laud street, Croydon, in the county of Surrey, England, engineer, have invented certain new and useful Improvements in Tire-Inflating Devices, of which the following is a specification.

This invention relates to inflators for the pneumatic tires of road vehicles and the like, and it consists of an improved device which is intended to be attached to the wheel of the vehicle when the pneumatic tire has become punctured and deflated, and to serve by continuous re-inflation of the leaking tire to maintain it in operative condition as long as may be necessary. The device may also serve for the customary inflation of a non-punctured tire while the wheel is stationary, being provided for this purpose with a crank by which the device may be operated.

Figure 1:
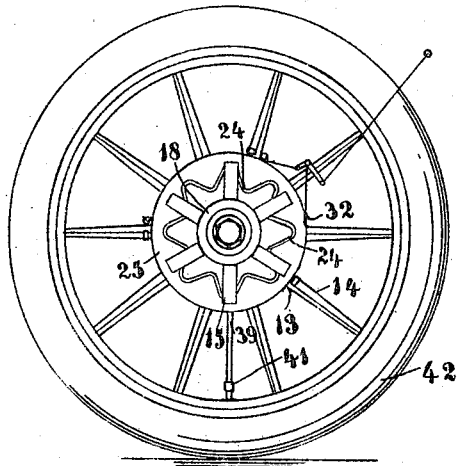
Figure 6:
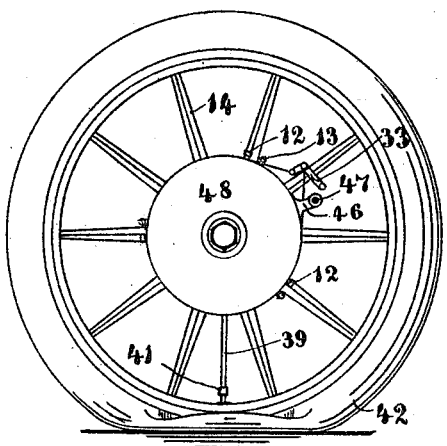
Figure 5:
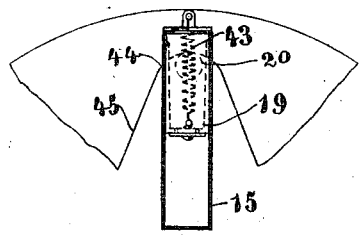
Figure 7:
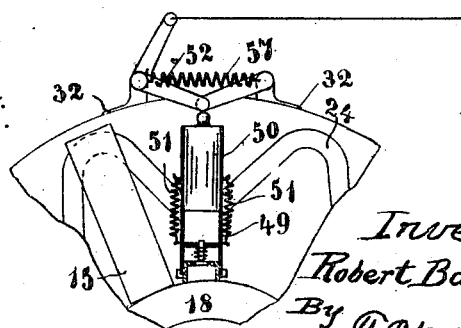
Figure 2:
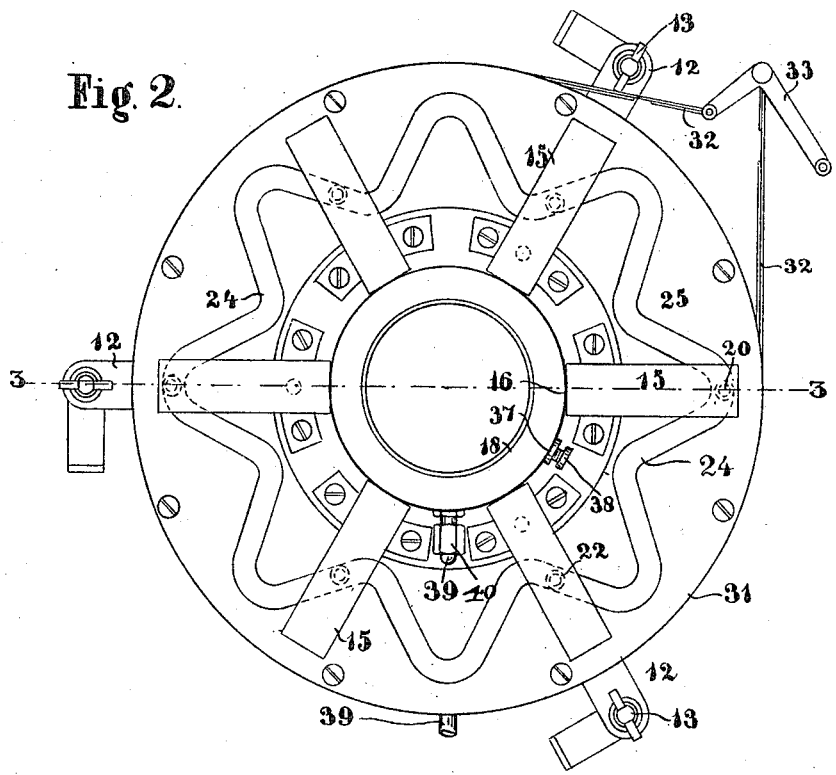
Figure 3:
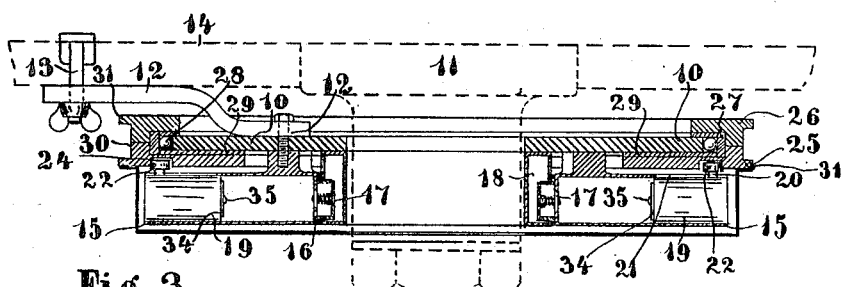
Figure 4:
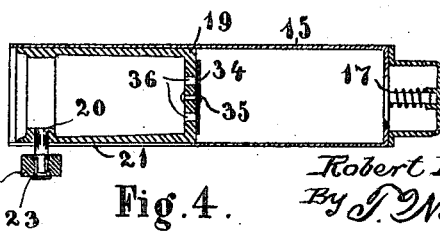

Upon the accompanying drawings which illustrate my invention, Figure 1 shows the device applied to the wheel of an automobile road vehicle. Fig. 2 is an elevation upon a larger scale. Fig. 3 is a cross section on line 3—3 of Fig. 2. Fig. 4 is a detail of one of the cylinders on a larger scale. Fig. 5 shows a modified arrangement for operating the pumping piston. Fig. 6 shows the device as used for the inflation of the tire of a stationary wheel. Fig. 7 represents the device for automatically releasing the brake band.

The circular frame 10 is mounted upon the road wheel 11 by means of clips 12 which are secured by bolts 13 to the spokes 14 of the road wheel. The pumping cylinders 15 are secured upon the frame 10 in a substantially radial position, and their inner ends 16 are provided with delivery valves 17 leading to a circular chamber or conduit 18. The pistons 19 are formed with studs or pins 20 which project through slots 21 in the sides of the cylinders and carry rollers 22 journaled upon ball bearings 23 and adapted to travel in a cam groove 24, which is formed in the plate 25. This plate 25 is secured to a ring 26 and the two are journaled by means of a hardened wearing piece 27 upon a ball race 28 on the outer edge of the frame 10; friction rings 29 are fitted on the side of the frame. The peripheries of the parts 25 and 26 form a drum 30 having flanges 31 and adapted to be engaged by a brake-band 32 contractible by means of a bell crank 33 connected to a stationary part of the vehicle.

By means of the brake-band 32 the drum 30 is held stationary while the vehicle travels and in this way the pistons 19 are reciprocated by the edges of the cam groove 24 engaging the pins 20.

The pistons 19 carry inlet valves consisting of flaps 34 of rubber or other suitable material secured by central rivets or the like 35, and adapted to seal the air-holes 36 during the compression stroke. The compressed air passes through the valves 17 into the chamber 18, which is furnished with a release valve 37; by adjusting the screw 38 this valve may be set to blow off at any desired pressure in order to save useless expenditure of energy when the tire is sufficiently inflated. An air pipe 39 secured to the conduit 18 by a union 40, leads the compressed air to the usual valve 41 of the pneumatic tire 42.

The cam groove 24 is preferably in the form of a sinuous curve formed upon the plate 25 attached to the outer or non-rotating member of the mechanism, so that the revolution of the central rotating frame 10 will cause the reciprocation of the pistons 19 as the roller-fitted pins 20 travel over the undulations of the groove 24. The number of waves is with advantage greater than the number of cylinders, in order to provide a regular delivery; there may be, for example and as shown, six single-acting cylinders and eight waves or complete sections of the curved groove. Instead of a sinuous groove or double-faced cam, I may employ a single cam surface with which the operating pins or rollers are maintained in contact by suitable springs.

In Fig. 5, the piston 19 is shown fitted with a spring 43 which presses the roller 20 against the cam-surface 44; in this way the suction strokes are effected by the action of the spring and the return or compression strokes by the inclines 45 of the cam.

In Fig. 6 the device is shown fitted with a crank 46 and handle 47 by which the outer drum may be revolved in order to pump air into the tire while the vehicle is at rest.

The apparatus is inclosed in a dust-proof and mud-excluding casing 48; this casing is shown in Figs. 2 and 6, but is removed in the other views in order to show the arrangement of the working parts.

The brake-band may be arranged, as shown in Fig. 7, with an adjusting device which allows it to slip or be released when the required pressure is obtained. An auxiliary cylinder 49 is connected to the compressed air chamber 18 in such a way that when this pressure is obtained the piston 50 is moved outward against a spring 51 and operates a crank 52 or other device which causes the grip of the brake-band to be slackened. When the pressure falls again the band is allowed to grip the drum once more. This crank 52 may be mounted on the same pivot as the bell crank 33 for the brake-band 32.

Having thus described my invention, what I claim as such and desire to secure by Letters Patent is:—

1. An inflator comprising a frame, a series of cylinders mounted upon said frame, suction and delivery valves to said cylinders, a reservoir into which each cylinder delivers air, a drum concentric with said frame, said drum being external of the series of cylinders and said reservoir being internal of said series, a cam surface upon said drum, pistons fitting in said cylinders, connections from said pistons to said cam surface, and means for causing relative rotation between said frame and said drum.

2. A tire inflator comprising a frame, a series of cylinders mounted radially upon said frame, suction and delivery valves to said cylinders, a drum concentric with said frame, said drum being external of the series of cylinders and said reservoir being internal of said series, a cam surface upon said drum, pistons in said cylinders, connections from said pistons to said cam surface, a compressed-air chamber into which the cylinders deliver, an air pipe from said chamber to the tire-valve, and means for causing relative rotation between said frame and said drum.

3. A tire inflator comprising a frame, a series of cylinders mounted upon said frame, suction and delivery valves to said cylinders, a drum concentric with said frame, a cam groove upon said drum said cam groove having a plurality of undulations, pistons in said cylinders, operating pins connected to said pistons, said pins traveling in said cam groove, a compressed air chamber with which each of said cylinders connects, an air pipe leading from said chamber to the tire valve, and means for causing relative rotation between said frame and said drum.

4. A readily applied and removable tire inflating attachment for road vehicle wheels, said inflator comprising a frame, cylinders mounted on said frame, said frame being adapted to be mounted upon the rotating wheel so as to revolve therewith, suction and delivery valves to said cylinders, a drum concentric with said frame, a cam surface upon said drum, pistons fitting in said cylinders, connections from said pistons to said cam surface and means for causing relative rotation between said frame and said drum.

5. An inflator comprising a frame, a series of cylinders mounted upon said frame, suction and delivery valves to said cylinders, a drum concentric with said frame, a reservoir into which the cylinders deliver compressed air, a cam surface upon said drum, pistons fitting in said cylinders, connections from said pistons to said cam surface, a protective casing inclosing said cylinders and cam surface, and means for causing relative rotation between said frame and said drum.

6. A tire inflator comprising a frame, a series of cylinders mounted upon said frame, a compressed air chamber, delivery valves leading from said cylinders to said chamber, a drum concentric with said frame, said frame being external of the series of cylinders and said reservoir being internal of said series, a cam groove upon said drum having a plurality of undulations greater than the number of cylinders in the series, pistons in said cylinders, operating pins connected to said pistons, said pins being fitted with rollers and traveling in said groove, suction valves upon said pistons, an air pipe leading from said air chamber to the tire valve, and means for causing relative rotation between said frame and said drum.

7. An inflator for road-wheel tires, comprising a frame, means for readily securing said frame in a detachable manner to the spokes of the road-wheel, cylinders mounted upon said frame, suction and delivery valves to said cylinders, a drum concentric with said frame said drum being external of the series of cylinders, a cam surface upon said drum, pistons fitting in said cylinders, connections from said pistons to said cam surface, and means for causing relative rotation between said frame and said drum.

8. An inflator comprising a frame, cylinders mounted upon said frame, suction and delivery valves to said cylinders, a drum concentric with said frame, a brake band encircling said drum, said brake band connected to a stationary point, a cam surface upon said drum, pistons fitting in said cylinders, connections from said pistons to said cam surface, a compressed air chamber, and means for releasing said brake band upon excessive pressure in said chamber.

In testimony whereof I affix my signature in presence of two witnesses.

ROBERT BARNFATHER.

Witnesses:
    VICTOR F. FEENY,
    CYRIL J. FEENY.